US007403862B2

United States Patent
Budmiger et al.

(10) Patent No.: US 7,403,862 B2
(45) Date of Patent: Jul. 22, 2008

(54) METHOD FOR OPERATING A PROCESS-MEASURING DEVICE

(75) Inventors: Thomas Budmiger, Ettingen (CH); Saso Jezernik, Zurich (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 11/289,619

(22) Filed: Nov. 30, 2005

(65) Prior Publication Data

US 2006/0080049 A1    Apr. 13, 2006

Related U.S. Application Data

(63) Continuation of application No. 10/879,532, filed on Jun. 30, 2004, now Pat. No. 7,079,958.

(60) Provisional application No. 60/485,747, filed on Jul. 10, 2003.

(30) Foreign Application Priority Data

Jun. 30, 2003    (DE)    ................................ 103 29 540

(51) Int. Cl.
   *G01F 1/00*    (2006.01)

(52) U.S. Cl. .............................. 702/45; 702/47; 702/50; 702/52; 73/861.12; 73/861.16; 73/861.17

(58) Field of Classification Search .................. 702/45, 702/47, 50, 52, 55; 73/861.16, 861.12, 861.17
See application file for complete search history.

(56) References Cited

U.S. PATENT DOCUMENTS 5,621,177 A * 4/1997 Torimaru ................. 73/861.16

* cited by examiner

*Primary Examiner*—John E Barlow, Jr.
*Assistant Examiner*—Sujoy K Kundu
(74) *Attorney, Agent, or Firm*—Bacon & Thomas, PLLC (57) ABSTRACT

The process measuring device comprises a flow sensor having a measuring tube, a sensor arrangement for producing a measurement signal, and an evaluation and operating circuit. The method serves to compensate for the effects of interfering potentials which are caused especially by foreign particles or air bubbles in the liquid to be measured. For this purpose, an anomaly in the waveform of the measurement signal caused at least in part by an electrical, especially pulse-shaped, interfering potential is detected by determining within a stored first data set a data group which digitally represents the anomaly. To generate an interference-free data set, the data belonging to the data group are removed from the stored first data set.

32 Claims, 6 Drawing Sheets

METHOD FOR OPERATING A PROCESS-MEASURING DEVICE

This application is a continuation of U.S. application Ser. No. 10/879,532 filed on Jun. 30, 2004 now U.S. Pat. No. 7,079,958, which is a nonprovisional of U.S. Provisional Application 60/485,747 filed on Jul. 10, 2003.

FIELD OF THE INVENTION

The invention relates to a method for operating a process measuring device, with which at least one physical, measured variable, especially a flow rate, a viscosity, or the like, of a medium held in a process container or flowing in a process pipeline is to be measured. Especially, the invention concerns a method for operating an electromagnetic flowmeter, with which the volume flow rate of an electrically conducting and flowing liquid is to be measured.

BACKGROUND OF THE INVENTION

In industrial process measurement technology, especially also in connection with the automation of chemical or other industrial processes, so-called field devices, thus process measuring devices installed near to the process, are employed for producing, on-site, measured-value signals as analog or digital representations of process variables. Examples of such process measuring devices, known per se to those skilled in the art, are described in detail in one or more of the following references from the patent literature: EP-A 984 248, EP-A 1 158 289, U.S. Pat. No. 3,878,725, U.S. Pat. No. 4,308,754, U.S. Pat. No. 4,468,971, U.S. Pat. No. 4,524,610, U.S. Pat. No. 4,574,328, U.S. Pat. No. 4,594,584, U.S. Pat. No. 4,617,607, U.S. Pat. No. 4,716,770, U.S. Pat. No. 4,768,384, U.S. Pat. No. 4,850,213, U.S. Pat. No. 5,052,230, U.S. Pat. No. 5,131,279, U.S. Pat. No. 5,231,884, U.S. Pat. No. 5,359,881, U.S. Pat. No. 5,363,341, U.S. Pat. No. 5,469,748, U.S. Pat. No. 5,604,685, U.S. Pat. No. 5,687,100, U.S. Pat. No. 5,796,011, U.S. Pat. No. 6,006,609, U.S. Pat. No. 6,236,322, U.S. Pat. No. 6,352,000, U.S. Pat. No. 6,397,683, WO-A 88 02 476, WO-A 88 02 853, WO-A 95 16 897, WO-A 00 36 379, WO-A 00 14 485, WO-A 01 02816 and WO-A 02 086 426.

Examples of the process variables to be registered include a volume flow rate, a mass flow rate, a density, a viscosity, a fill or limit level, a pressure or a temperature, or the like, of a process medium in the form of a liquid, powder, vapor, or gas conducted or available in a corresponding process container, such as e.g. a pipeline or a tank.

For registering the respective process variables, the process measuring device has a corresponding, usually physical-electrical, sensor, which is placed in a wall of the container conducting the process medium or in the course of a process pipeline conducting the process medium, and which serves for producing at least one measurement signal, especially an electrical signal, representing the primarily registered process variable as accurately as possible. For this purpose, the sensor is additionally connected with a suitable measuring device electronics serving especially for a further processing or evaluation of the at least one measurement signal. This includes usually an operating circuit driving the sensor and a measuring and evaluation circuit for further processing of its measurement signals.

Process measurement devices of the described type are usually connected together by way of a data transmission system connected to the measuring device electronics and/or with corresponding process control computers, to which they transmit the measured-value signals e.g. via a (4 mA to 20 mA)-current loop and/or via digital data bus. Serving as data transmission systems in such case are field bus systems, especially serial ones, such as e.g. PROFIBUS-PA, FOUNDATION FIELDBUS, with their corresponding transmission protocols. The transmitted, measured-value signals can be processed further by means of the process control computers and visualized as corresponding measurement results e.g. on monitors and/or transformed into control signals for process adjusting actuators, such as e.g. magnetic valves, electromotors, etc.

For accommodating the measuring device electronics, such process measuring devices include, furthermore, an electronics housing, which, as e.g. proposed in U.S. Pat. No. 6,397,683 or WO-A 00 36 379, can be situated away from the process measuring device and connected therewith only over a flexible cable, or which, as e.g. shown in EP-A 903 651 or EP-A 1 008 836, is arranged directly on the sensor or on a sensor housing separately housing the sensor. Often, the electronics housing then serves, as shown, for example in EP-A 984 248, U.S. Pat. No. 4,594,584, U.S. Pat. No. 4,716,770 or U.S. Pat. No. 6,352,000, also for accommodating some mechanical components of the sensor, such as e.g. membrane, rod, shell or tubular, deformation or vibration bodies, which deform during operation under the influence of mechanical loads; see, in this connection, also the above-mentioned U.S. Pat. No. 6,352,000.

For measuring electrically conductive fluids, flowmeters having an electromagnetic flow sensor are often used. In the following, if expedient, reference will be just to flow sensors, or flowmeters, for short. As is known, electromagnetic flowmeters permit measurement of the volume flow rate of an electrically conducting liquid flowing in a pipeline and represent such measurement in the form of a corresponding, measured value; thus, per definition, the volume of liquid flowing through a pipe cross section per unit time is measured. Construction and manner of operation of electromagnetic flowmeters are known per se to those skilled in the art and are described in detail, for example, in DE-A 43 26 991, EP-A1 275 940, EP-A 12 73 892, EP-A 1 273 891, EP-A 814 324, EP-A 770 855, EP-A 521 169, U.S. Pat. No. 6,031,740, U.S. Pat. No. 5,487,310, U.S. Pat. No. 5,210,496, U.S. Pat. No. 4,410,926, US-A 2002/0117009 or WO-A 01/90702.

Flow sensors of the described type usually each exhibit a non-ferromagnetic, measuring tube which is connected into the pipeline in a liquid-tight manner, for example by means of flanges or threaded joints. The portion of the measuring tube which contacts the liquid is generally electrically non-conductive, so that no short circuit is present for a voltage induced in the liquid according to Faraday's law of electromagnetic induction by a magnetic field cutting across the measuring tube.

In keeping with this practice, metal measuring tubes are commonly provided internally with a nonconductive lining, e.g., a lining of hard rubber, polyfluoroethylene, etc., and are themselves generally non-ferromagnetic; in the case of measuring tubes made entirely of plastic or ceramic, particularly of alumina ceramic, the nonconductive lining is, in contrast, not necessary.

The magnetic field is produced by means of two coil assemblies, each of which is, in the most frequent case, mounted on the outside of the measuring tube along a diameter of the latter. Each of the coil assemblies commonly includes an air-core coil or a coil with a core of soft magnetic material.

To ensure that the magnetic field produced by the coils is as homogeneous as possible, the coils are, in the most frequent and simplest case, identical and electrically connected in series, thus aiding one another, so that in operation they can be traversed by the same excitation current. It is also known, however, to pass an excitation current through the coils alternatingly in the same direction and in opposite directions so as to be able to determine, for example, the viscosity of liquids and/or a degree of turbulence of the flow; see, in this connection, also EP-A 1 275 940, EP-A 770 855, or DE-A 43 26 991.

The excitation current just mentioned is produced by an operating electronics; the current is regulated at a constant value of, e.g., 85 mA, and its direction is periodically reversed. The current reversal is achieved by incorporating the coils in a so-called T network or a so-called H network; for the current regulation and current reversal, see U.S. Pat. No. 4,410,926 or U.S. Pat. No. 6,031,740.

The mentioned, induced voltage appears between at least two galvanic (thus, wetted by the liquid), measuring electrodes or between at least two capacitive (thus, arranged within the wall of the measuring tube), measuring electrodes, with each of the electrodes picking up a separate potential.

In the most frequent case, the electrodes are mounted at diametrically opposed positions such that their common diameter is perpendicular to the direction of the magnetic field, and thus perpendicular to the diameter on which the coil assemblies are located. The induced voltage is amplified, and the amplified voltage is conditioned by means of an evaluation circuit to obtain a measurement signal which is recorded, indicated, or further processed. Suitable evaluation electronics are familiar to those skilled in the art, for example from EP-A 814 324, EP-A 521 169, or WO-A 01/90702.

In principle, the absolute value of the potential at the respective electrode is of no significance for the measurement of the volumetric flow rate, but only on condition that, on the one hand, the potentials lie in the dynamic range of a differential amplifier following the electrodes, i.e., that this amplifier must not be overdriven by the potentials, and that, on the other hand, the frequency of potential changes differs significantly from the frequency of the above-mentioned current direction reversal.

The potential at each electrode is not only dependent on the magnetic field according to Faraday's law—the geometrical/spatial dimensions of the measuring tube and the properties of the liquid enter into this dependence—, but this measurement signal, which is based on Faraday's law and should be as clean as possible, has interfering potentials of different geneses superimposed on it, as already discussed in EP-A 1 273 892 or EP-A 1 273 891. These interfering potentials can contribute substantially to a degradation of the measurement accuracy.

A first kind of interfering potential results from inductive and/or capacitive interference which emanates from the coil assemblies and their leads, and which changes the electric charge on the capacitor that exists at the boundary layer between electrode and liquid. As a result of asymmetries in the concrete structure of the flow sensor, particularly as far as the conductor routing to the coil assemblies and to the measuring electrodes is concerned, the interfering potential of one electrode generally differs from the interfering potential of the other electrode.

This—first—effect may, on the one hand, restrict the dynamics of the differential amplifier. On the other hand, the value of the difference between the interfering potentials of the electrodes is subject to variances in flow-sensor parameters due to manufacturing tolerances. Also, the determinable dependence of the electrode potentials on the velocity of the liquid is partly due to this effect, because at low velocities, the above-mentioned charges at the boundary layer between electrode and liquid are not removed by the latter.

A second kind of interfering potential is caused by particles of foreign matter or by air bubbles which are entrained by the liquid and which, when colliding with an electrode, cause sudden changes in the potential of the electrode. The decay time of these changes is dependent on the type of liquid and is generally greater than the rise time of the changes.

This—second—effect, too, results in an erroneous measurement signal. The error is also dependent on the potential of the electrode. Since this potential varies from flow sensor to flow sensor due to manufacturing tolerances, as was explained above, the second effect adds to the first effect, so that the individual flow sensor units differ widely in their behaviors, this being, of course, highly undesirable.

A third kind of interfering potential is caused by coatings deposited by the liquid on the measuring electrodes, as is also described in U.S. Pat. No. 5,210,496, for example. The formation of the coatings is very strongly dependent on the velocity of the liquid. The differences in the behavior of the individual flow sensor units may be further increased by the formation of the coatings.

EP-A 1 273 892 proposes a method of operating an electromagnetic flow sensor in which the development of the above-mentioned interfering potentials of whatever kind is prevented, or at least their effect is significantly reduced, by at least intermittently applying voltage pulses generated by means of the evaluation and operating circuit to at least one of the two measuring electrodes. The use of this method can lead to a considerable improvement in the accuracy of electromagnetic flowmeters, particularly in the case of single-phase or thoroughly mixed multiphase liquids. Beyond this, in EP-A 337 292 or WO-A 03/004977, for example, methods are described in which the measuring electrodes, particularly by being short-circuited to ground in timed sequence or by application of a harmonic alternating voltage, are subjected over a prolonged period of time to an interfering-potential-eliminating discharge voltage.

One disadvantage of this prior-art method of measurement, and of flow sensors using this method, is that in the case of multiphase liquids with distinctly separated liquid phases or in the case of pasty-viscous liquids, for example, a rather stochastic, practically inestimable distribution of the entrained particles of foreign matter or of the gas bubbles is to be expected, which can hardly be calibrated. To a corresponding extent, at least interfering potentials of the second kind cannot be sufficiently reliably removed from the measuring electrodes.

SUMMARY OF THE INVENTION

It is therefore an object of the invention to provide a method whereby the effects of the aforementioned interfering potentials, particularly of the potentials of the second kind, can be largely compensated for, so that a measured value can be obtained which is substantially independent of such interfering potentials, particularly of potentials of the second kind.

To attain this object, the invention provides a method of operating a process measuring device, especially an electromagnetic flowmeter having a measuring tube inserted in a line conducting a medium, especially a fluid medium, which method comprises the steps of:

causing the fluid to flow through the measuring tube;

causing an electrical, particularly bipolar, excitation current to flow through an operating circuit of the flowmeter to drive an excitation arrangement arranged on the measuring tube and acting on the measuring tube and/or on the medium flowing therethrough;

producing, by means of a sensor arrangement arranged on the measuring tube, at least one, electrical, measurement signal corresponding to the physical, measured variable;

digitizing the measurement signal or at least a portion thereof to generate a digital sampling sequence representative of a waveform of the measurement signal;

storing at least a part of the digital sampling sequence to generate a first data set, which represents, instantaneously, a waveform of the measurement signal within a predeterminable time interval;

detecting an anomaly in the waveform of the measurement signal caused at least in part by an, especially pulse-shaped, interfering potential contained in the measurement signal, by detecting within the stored first data set a data group which digitally represents the anomaly;

extracting the data belonging to the data group from the stored first data set to generate an interference-free second data set; and determining, using the second data set, a measured value representative of a physical variable of the flowing fluid.

Furthermore, the invention provides an electromagnetic flowmeter for a fluid flowing in a line, the flowmeter comprising:

a measuring tube, designed to be inserted into the line, for conducting the fluid;

an evaluation and operating circuit;

means, fed by the evaluation and operating circuit, for producing a magnetic field cutting the measuring tube, the means comprising a coil arrangement mounted on the measuring tube and traversed by an excitation current;

at least two measuring electrodes for picking up potentials induced in the fluid flowing through the measuring tube and cut by the magnetic field;

means, connected at least intermittently to the measuring electrodes, for generating at least one measurement signal derived from the potentials picked up by the measuring electrodes; and means for storing a first data set comprised of digitized measurement data and representing, instantaneously, a waveform of the measurement signal within a predeterminable time interval;

wherein the evaluation and operating circuit detects, by means of the first data set, an anomaly in the measurement signal caused by an interfering potential appearing at least one of the measuring electrodes, extracts the detected anomaly from the first stored data set and generates a second data set free from the detected anomaly, and generates by means of the anomaly-free data set at least one measured value representative of a physical variable of the flowing fluid.

In a first preferred embodiment of the method of the invention, the second data set also includes digital measurement data originally contained in the first data set.

In a second preferred embodiment of the method of the invention, the step of detecting the anomaly comprises the step of determining a first time value by means of the first data set, which time value represents an instant of the start of an interference voltage corresponding to the interference potential.

In a third preferred embodiment of the method of the invention, the step of determining the first time value comprises the steps of comparing the digital data of the first data set with a predeterminable first threshold value and generating a first comparison value, which signals an exceeding of the first threshold value.

In a fourth preferred embodiment of the method of the invention, the step of detecting the anomaly comprises the step of determining a second time value by means of the first data set, which second time value represents an instant of the ending of the interference voltage.

In a fifth preferred embodiment of the method of the invention, the step of determining the second time value comprises the steps of comparing the digital data of the first data set with a predeterminable second threshold value and generating a second comparison value, which signals a subceeding of the second threshold value, i.e. the second threshold value has been fallen below.

In a sixth preferred embodiment of the method of the invention, the step of detecting the anomaly comprises the step of determining an amplitude value by means of the first data set, which amplitude value represents an amplitude, especially a maximum absolute amplitude, of the measurement signal within the predeterminable time interval.

In a seventh preferred embodiment of the method of the invention, the step of detecting the anomaly comprises the step of determining a third time value by means of the first data set, which third time value represents an instant of the occurrence of the amplitude, especially the maximum absolute amplitude, of the measurement signal within the predeterminable time interval.

In an eighth preferred embodiment of the method of the invention, the step of detecting the anomaly comprises the step of forming a time difference between the first time value and the second time value to determine a fourth time value representing the duration of the occurrence of the interference voltage.

In a ninth preferred embodiment of the method of the invention, the step of detecting the anomaly comprises the steps of comparing the amplitude value with a predeterminable third threshold value, particularly with a threshold value variable during operation, and generating a third comparison value, which signals an exceeding of the third threshold value.

In a tenth preferred embodiment of the method of the invention, the step of generating the interference-free, second data set comprises the step of determining, using the measurement signal, particularly the digitized measurement signal, an average value for the voltage induced in the flowing fluid.

In an eleventh preferred embodiment of the method of the invention, the step of generating the interference-free, second data set comprises the step of determining, using digital data of the first data set, an average value for the voltage induced in the flowing fluid.

In a twelfth preferred embodiment of the method of the invention, the step of generating the interference-free second data set comprises the step of determining, using digital data having a time value less than the first time value, an average value for the voltage-induced in the flowing fluid.

In a thirteenth preferred embodiment of the method of the invention, the step of generating the interference-free second data set comprises the step of determining an average value for the voltage induced in the flowing fluid using digital data with a time value greater than the second time value.

In a fourteenth preferred embodiment of the method of the invention, the step of generating the interference-free second data set comprises the step of generating an artificial third data set of digital data using at least part of the data from the data group representative of the anomaly, which third data set approximates the waveform of the interference voltage.

In a fifteenth preferred embodiment of the method of the invention, the step of generating the artificial third data set comprises the step of determining at least one regression, or data-fitting, function for at least part of the digital data from the data group representative of the anomaly.

In a sixteenth preferred embodiment of the method of the invention, the step of generating the artificial third data set comprises the step of generating digital data using data values from the data group representative of the anomaly and using the determined regression function.

In a seventeenth preferred embodiment of the method of the invention, the step of generating the interference-free second data set comprises the step of forming a difference between one of the data values from the data group representative of the anomaly and one of the data values from the artificial third data set, the respective two data values used for forming the difference having corresponding, especially identical, time values.

In an eighteenth preferred embodiment of the method of the invention, the step of generating the at least one regression function comprises the step of determining, using data values from the data group representative of the anomaly, at least one coefficient, particularly a time constant, for the regression function.

In a nineteenth preferred embodiment of the method of the invention, the step of generating the at least one regression function comprises the step of determining a coefficient, particularly a time constant, for the regression function, using the average value determined instantaneously for the voltage induced in the flowing fluid.

In a twentieth preferred embodiment of the method of the invention, the step of determining the coefficient for the regression function comprises the steps of forming a first difference between a first data value from the data group representative of the anomaly and the average value instantaneously determined for the voltage induced in the flowing fluid, forming a second difference between a second data value from the data group representative of the anomaly and the average value instantaneously determined for the voltage induced in the flowing fluid, and forming a quotient of the first difference and the second difference.

In a twenty-first preferred embodiment of the method of the invention, the step of determining the coefficient for the regression function comprises the steps of generating a digital sequence of provisional coefficients for the regression function and digital, especially recursive, filtering of the digital sequence of provisional coefficients.

In a twenty-second preferred embodiment of the method of the invention, the step of generating the third data set comprises the step of determining at least a second regression function for at least a second part of the digital data from the data group representative of the anomaly.

According to a further development of the method of the invention, the excitation arrangement which is used comprises an arrangement of coils for producing a magnetic field, especially also the magnetic field cutting through the medium conducted in the measuring tube.

According to a preferred embodiment of this further development of the invention, the sensor arrangement which is used comprises measuring electrodes arranged on the measuring tube and the method comprises the following steps:

Producing by means of the excitation arrangement a magnetic field also cutting through the fluid;

inducing a voltage in the flowing fluid for changing potentials applied to the measuring electrodes; and taking potentials applied to the measuring electrodes for producing the at least one measurement signal.

A basic idea of the invention is to detect, on the basis of anomalies corresponding to the interference potentials, the widely varying interfering potentials in at least one measurement signal, especially directly and in the time domain or, rather, in the sampling time domain, on the basis of anomalies which occur in at least one measurement signal delivered by the sensor arrangement of the flow sensor, or in digitally stored data sets derived from the measurement signal. By extracting the digital data corresponding to the anomalies and replacing such by calculated data, data sets are created, which are essentially composed, in part, of original measurement data and, in part, of synthetic, calculated data.

The invention is based on the surprising discovery that while interfering potentials of the kind described may be highly stochastically distributed, the anomalies to be detected generally have a typical characteristic or typical form whose detection makes it possible both to identify such interfering potentials in the digitally stored data records derived from the measurement signal and to eliminate such interfering potentials by manipulation, particularly by nonlinear digital filtering, of the digital data affected by the interfering potentials, with the information originally contained in the measurement signal about the physical variable to be measured being, on the one hand, largely preserved and, being, on the other hand, made very rapidly available for the determination of the measured value.

The method of the invention and further advantages will now be explained in greater detail on the basis of waveforms and schematic circuit diagrams presented in the figures of the drawing, in which:

BRIEF DESCRIPTION OF THE DRAWINGS

FIGS. 2b, c; show waveforms of potentials measurable during operation of the

FIGS. 3a, b; process measuring device of FIGS. 1a, 1b; and

FIGS. 4a, b;

FIGS. 5a, b

DESCRIPTION OF THE PREFERRED EMBODIMENTS

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Figure 1A:
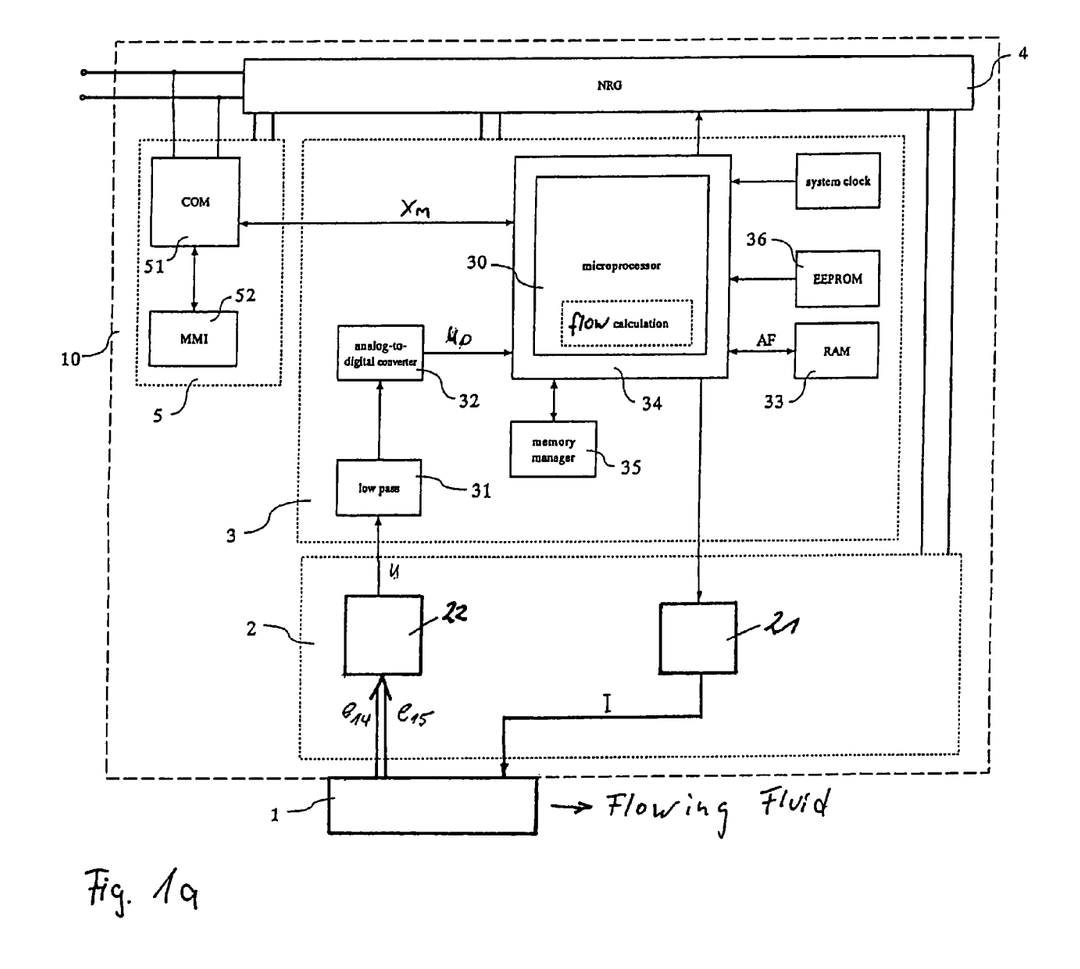
FIGS. 1a, b show schematically and partly in block-diagram form a process measuring device—here in the form of an electromagnetic flowmeter—suitable for carrying out the method of the invention.

FIG. 1 shows schematically and partly in the form of a block-diagram a process measuring device—in this instance an electromagnetic flowmeter—suitable for carrying out the method of the invention. The process measuring device is designed to produce measured values of least one physical variable of a medium, especially a fluid, flowing in a pipeline (not shown). For example, the flowmeter can be used to measure a volumetric flow rate and/or a flow velocity of an electrically conductive liquid.

The flowmeter illustrated here includes a flow sensor 1 for generating measurement potentials corresponding to the physical variable to be measured, an operating circuit 2 for collecting the measurement potentials and generating at least one measurement signal corresponding to the physical variable, and an evaluation circuit 3 designed to control the operating circuit 2, and thus the flow sensor 1, and to generate measured values representative of the physical variable on the basis of the at least one measurement signal. Operating circuit 2, and possibly also some components of flow sensor 1, can, for example, be housed in an electronics case 10 of the flowmeter, as indicated schematically in FIG. 1a.

Flow sensor 1 includes a measuring tube 11, which is designed to be inserted in the aforementioned pipeline and has a tube wall and through which during operation the fluid to be measured is made to flow in the direction of a longitudinal axis of the tube.

To prevent a short circuit from being created for voltages induced in the fluid, an inner portion of measuring tube 11, which contacts the fluid, is made electrically nonconductive. Metal measuring tubes are, for such purpose, commonly provided with an electrically nonconductive lining, e.g., a lining of hard rubber, polyfluoroethylene, etc., and are generally non-ferromagnetic; in the case of measuring tubes made entirely of plastic or ceramic, particularly of alumina ceramic, the electrically non-conductive lining is not necessary.

An excitation arrangement of the flowmeter, actuated by driver electronics 21 provided in operating circuit 2, includes, in this example, a first field coil 12 and a second field coil 13, which are arranged on measuring tube 11. Field coils 12, 13 are located on a first diameter of the measuring tube 11. The excitation arrangement serves to produce a magnetic field H which cuts the tube wall and the fluid flowing through the tube. The magnetic field is set up when an excitation current I driven by driver electronics 21 is passed through field coils 12, 13, which in this embodiment are connected in series. The preferably bipolar excitation current I can be in the form of a rectangular-wave, triangular, or sine-wave current, for example.

FIG. 1b shows that field coils 12, 13 do not contain a core, i.e., that they are air coils. However, as is usual with such coil arrangements, field coils 12, 13 may also be wound on a core which will generally be soft magnetic, and the cores may cooperate with pole pieces; see, for instance, U.S. Pat. No. 5,540,103.

The excitation arrangement formed in the illustrated embodiment as a coil arrangement electromagnetically acting on the medium is here preferably so designed, and the two field coils 12, 13, in particular, are so shaped and dimensioned, that within measuring tube 11, the magnetic field H produced with the two coils is symmetric, particularly rotationally symmetric, with respect to a second diameter which is perpendicular to the first diameter.

Figure 2A:
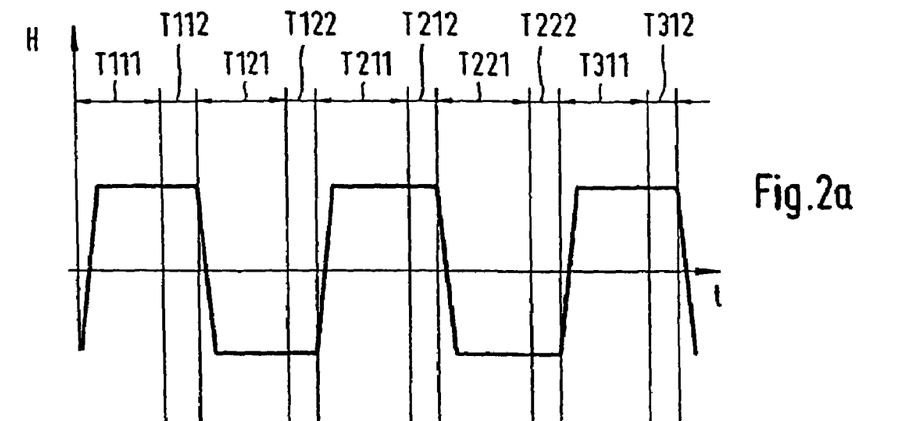
FIG. 2a shows a waveform of an excitation current flowing during operation of the process measuring device of FIGS. 1a, 1b.

In one embodiment of the invention, driver electronics 21 generates a direct current, especially a current regulated at a constant amplitude, which is then periodically switched by means of a suitable switching circuit, e.g., a circuit configured as a H or T network, and thus modulated to obtain an alternating current of controlled amplitude. Thus, the excitation current I is made to flow through the coil arrangement in such a way that coils 12, 13, as shown schematically in FIG. 2a, are each traversed in a first current direction during a first switching phase PH11 and in a direction opposite to the first direction during a subsequent, second switching phase PH12; for the current regulation and reversal, see also U.S. Pat. No. 4,410,926 or U.S. Pat. No. 6,031,740.

The second switching phase PH12 is followed by a third switching phase PH21, during which the excitation current I flows in the first direction again. The third switching phase is followed by a fourth switching phase PH22, during which the excitation current I flows in the opposite direction again. This is followed by a switching phase PH31, and so forth. With respect to the reversal of the direction of the excitation current I, every two successive switching phases form a switching period P1, P2, P3, etc. Together with the reversal of the excitation current I flowing through the coil arrangement, aside from a possible switching-phase shift essentially synchronous therewith, the polarity of the magnetic field H is repeatedly reversed, cf. FIG. 2a.

For producing at least one electrical measurement signal corresponding to the measured variable, a sensor arrangement is provided in the measurement sensor, arranged on the measuring tube or at least in its vicinity. According to a preferred embodiment of the invention, the sensor arrangement includes electrodes mounted essentially directly to the measuring tube. A first electrode 14 mounted on the inside of the wall of measuring tube 11 serves to pick up a first potential $e_{14}$ induced by the magnetic field H. A second electrode 15 on the inside of the tube wall serves to pick up a second potential $e_5$ induced by the magnetic field. Electrodes 14, 15 are located on the measuring tube second diameter, which is perpendicular to the first diameter and to the longitudinal axis of the measuring tube; they may also be located, for example, on a chord of measuring tube 11 which is parallel to the second diameter, see also U.S. Pat. No. 5,646,353.

In FIG. 1b, the measuring electrodes 14, 15 are galvanic electrodes, i.e., electrodes which contact the fluid. It is also possible to use two capacitive electrodes, i.e., electrodes fitted in the wall of measuring tube 11, for example. Each of the electrodes 14, 15 picks up a separate electric potential $e_{14}$, $e_{15}$, which in operation is induced, according to Faraday's law, in the fluid flowing through the measuring tube.

As shown in FIG. 1b, in operation, electrodes 14 and 15 are at least intermittently connected to a non-inverting input and an inverting input, respectively, of a differential amplifier 22. Thus, a difference of the two potentials $e_{14}$, $e_{15}$ picked up by electrodes 14, 15 is formed, which corresponds to a voltage developed in the flowing fluid, and thus to the physical variable to be measured, and which serves as a measurement signal u. The potentials $e_{14}$, $e_{15}$ at electrodes 14, 15 are generally in a range of 10 to 100 mV.

As shown schematically in FIGS. 1a and 1b, the measurement signal u occurring at the output of differential amplifier 22 is fed to evaluation circuit 3 provided in the flowmeter. According to the invention, evaluation circuit 3 serves in particular to digitize the received measurement signal u and store it sectionally in the form of a first data set $DS_1$, so that information about the waveform of a section of the measurement signal u is available in digital form for the determination of the measured value $X_M$.

To this end, in evaluation circuit 3, the measurement signal u, as shown schematically in FIG. 1a, is preferably first passed through a low-pass filter 31 of predeterminable order and adjustable cutoff frequency, e.g., a passive or active, RC filter. Low-pass filter 31 serves to band-limit the measurement signal u, in order to avoid aliasing, and thus preprocesses the signal for digitization. According to the well-known Nyquist theorem, the cutoff frequency is set to less than 0.5 times the rate at which the passed component of the measurement signal u is sampled. If the measurement signal u has already been band-limited in the necessary manner, low-pass filter 31 can be dispensed with.

The output of low-pass filter 31 is coupled to a signal input of an analog-to-digital (A/D) converter 32 of evaluation circuit 3, which converts the measurement signal u received from low-pass filter 31 to a corresponding, digital measurement signal $u_D$. A/D converter 32 can be any of the A/D converters familiar to those skilled in the art, e.g., converters using serial or parallel conversion, which can be clocked at the above-mentioned sampling rate. A suitable A/D converter type is, for example, the delta-sigma A/D converter ADS 1252 of Texas Instruments Inc. with 24-bit resolution and a permissible sampling rate less than or equal to 40 kHz, it being understood that sampling rates less than 10 kHz can be quite sufficient for the implementation of the method according to the invention.

If A/D converter 32, e.g., the aforementioned ADS 1252, is provided for converting exclusively positive signal values, a reference voltage of the converter must be chosen so that a minimum signal value to be expected at the input of the converter will set at least one bit, particularly the most significant bit (MSB), of the measurement signal UD. In other words, a DC component must be added to the output signal of low-pass filter 31 so that this signal will act on A/D converter 32 essentially as a DC signal of variable amplitude.

The measurement signal UD provided at the output of A/D converter 32 is loaded segment by segment, e.g. via an internal data bus, into a volatile data memory 33 of evaluation circuit 3, where it is kept available as a finite sampling sequence AF instantaneously representing the measurement signal u in the form of an ensemble of digitally stored measurement data, particularly for a digital flow-computer 34 of evaluation circuit 3. Data memory 33 can be implemented with a static or dynamic, random-access memory, for example.

A width for an instantaneous sampling window, i.e., a time length of the section of the sampling sequence AF to be stored, for instantaneously representing the measurement signal u, may lie, for example, in the range of the total duration of one of the switching periods P1, P2 with which the excitation current I is clocked, or in the range of the duration of one of the switching phases PH11, PH12, PH21, PH22. Accordingly, the clocking for reading into data memory 33 is essentially in phase with the clocking of the excitation current. Clock periods commonly used in conventional flowmeters of the kind described are approximately in the range of 10 to 100 ms; at a 10-kHz sampling rate $f_a$ of A/D converter 32, this would give 100 to 1000 samples of the sampling sequence AF, or the first data set.

If necessary, e.g. because of a lower capacity of data memory 33 or in order to eliminate introductory voltage transients caused by field reversals, it is also possible to read into data memory 33 only a portion of the measurement signal u, or, rather, the digital measurement signal $u_D$, generated per switching phase. To illustrate this, each of the above-mentioned switching phases PH11, PH12, PH21, PH22, PH31 is subdivided into a first subperiod T111, T121, T211, T221, T311, serving to establish the magnetic field, and an associated second subperiod T112, T122, T212, T222, T312, serving as a measurement phase; cf. FIGS. 2a, 2b, and 2c. Preferably, in this embodiment of the invention, only a waveform of the measurement signal u associated with the respective second subperiod T112, T122, T212, T222, T312 is virtually mapped in data memory 33, with the evaluation of the measurement data and the generation of the measured value taking place during the respective next magnetic field establishment phase T121, T211, T221, T311.

To generate the measured value $X_M$ from the sampling sequence AF, flow computer 34 has an at least temporary access, particularly a data reading access, to data memory 33 and the data sets stored therein, e.g. via the internal data bus. Flow computer 34 is advantageously implemented with a microprocessor 30 and computing programs running therein, as shown schematically in FIG. 1a.

In a preferred embodiment of the invention, evaluation circuit 3 further comprises a memory manager 35 implemented as a separate subcircuit which, communicating with microprocessor 30, e.g. via the internal data bus, serves to manage data memory 33, especially to control the sampling of the digital measurement signal UD and the generation of the sampling sequence AF, thus reducing the load on microprocessor 30. Memory manager 35 is preferably implemented with a programmable logic device, such as a PAL (programmable array logic) or an FPGA (field-programmable gate array). If necessary, memory manager 35 can also be implemented with microprocessor 30 or with a further microprocessor (not shown) and suitable computing programs running therein. By means of memory manager 35 it is also possible to implement, for example, the averaging or the determination of the median usual for such flowmeters, this to be done over plural sampling sequences.

Figure 2B:
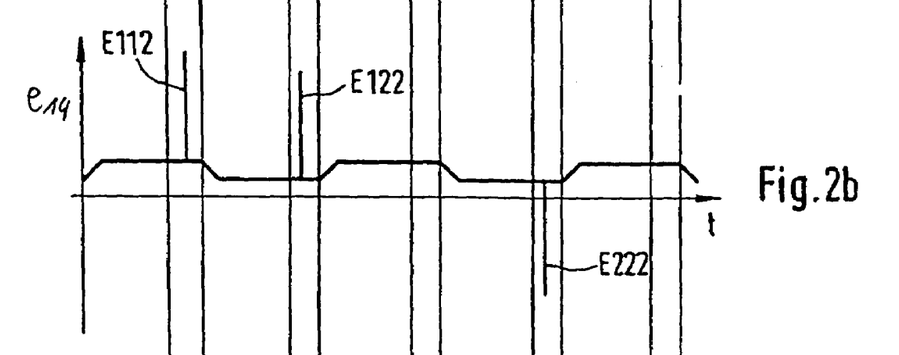
Figure 2C:
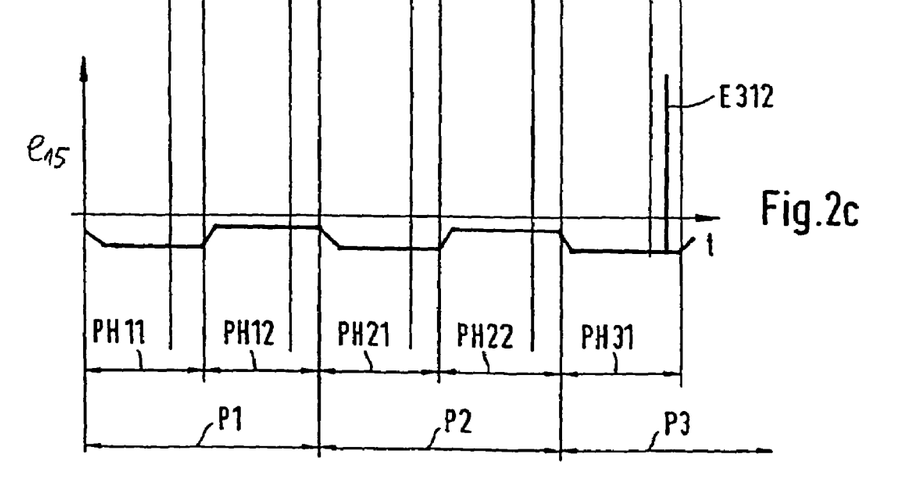
Figure 3A:
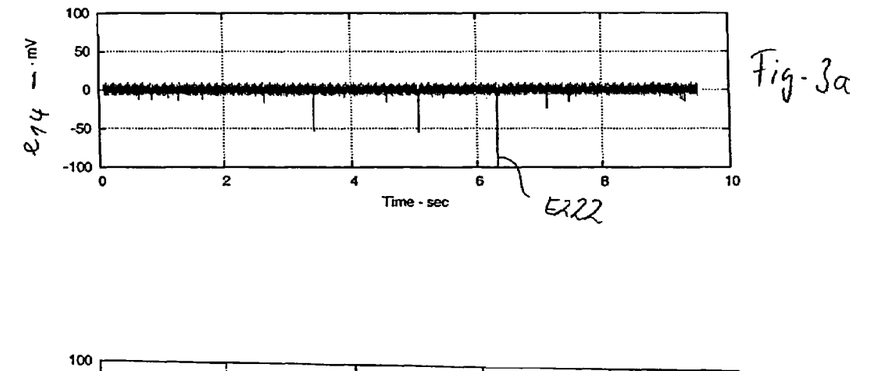
Figure 3B:
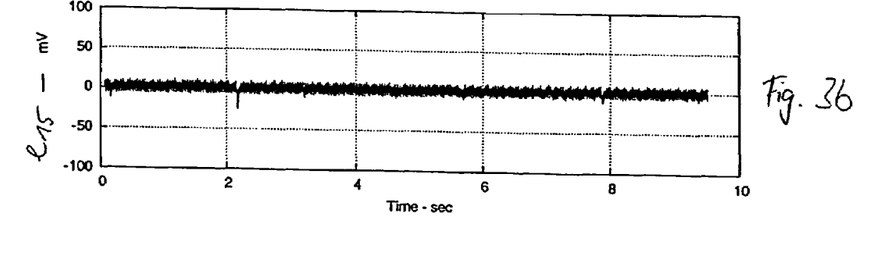
Figure 4A:
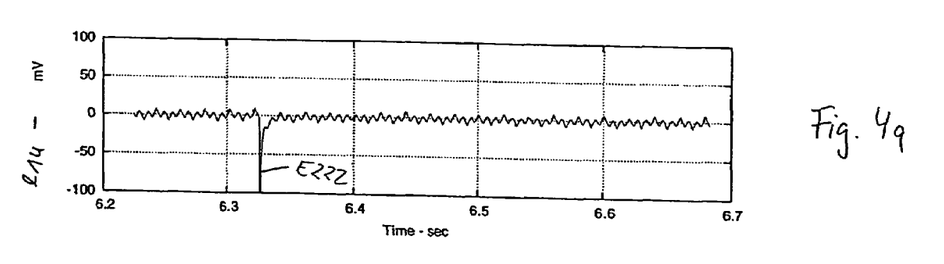
Figure 4B:
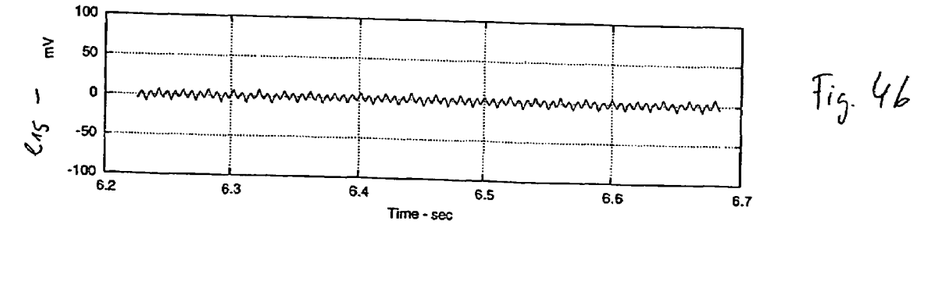
Figure 5A:
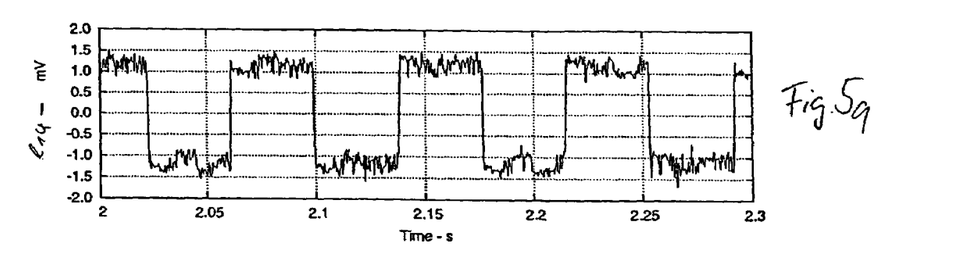
Figure 5B:
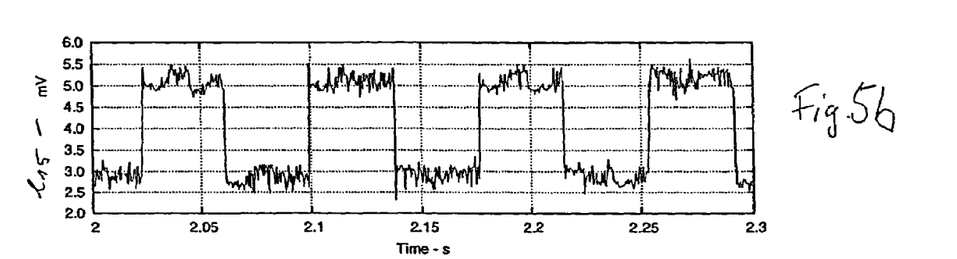

As mentioned, due to interfering potentials E112, E122, E222, E312 appearing at the measuring electrodes 14, 15, the measurement signal u may be severely disturbed and thus corrupted; see also FIGS. 2b, 2c. To illustrate this, FIGS. 3a, 3b show waveforms of the potentials $e_{14}$, $e_{15}$ recorded over approximately ten seconds, on which interfering potentials are superimposed. In FIGS. 4a, 4b, portions of the recorded potential waveforms $e_{14}$, $e_{15}$ which are disturbed in the manner described are shown again on another time scale; virtually interference-free portions of the potential waveforms $e_{14}$, $e_{15}$ shown in FIGS. 3a, 3b are again illustrated in FIGS. 5a, 5b.

Investigations of the waveforms of such interfering potentials have shown that, while the amplitudes of such interfering potentials or the instants of their occurrence, for example, are not predeterminable, a typical amplitude characteristic can be postulated at least for a great number of interfering potentials and taken into account as a-priori information in the evaluation of the measurement signal u and in the determination of the measured values. To the inventors' surprise, it turned out that the interfering potentials are reflected in the waveform of the measurement signal u in the form of distinct anomalies, whose characteristic can be determined beforehand, at least qualitatively. It turned out that, in operation, these anomalies can be comparatively reliably detected within the sampling sequence or, rather, by means of the current data set $DS_1$, derived therefrom, and can be eliminated from the data set at the expense of a comparatively very small loss of information.

Figure 6A:
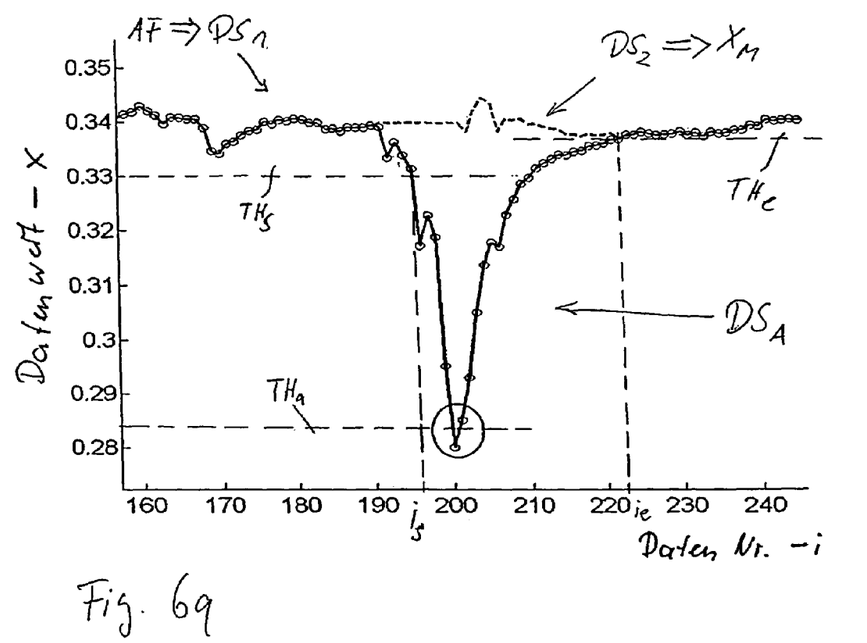
FIGS. 6a, b show digitally stored curves of potentials measured during operation of the process measuring device of FIGS. 1a, 1b.

Accordingly, in the method according to the invention, an anomaly in the waveform of the measurement signal u caused at least in part by an interfering potential, particularly by a pulse-shaped interference voltage, appearing at at least one of the measuring electrodes 14, 15 is detected, as schematically illustrated in FIG. 6a, by determining within the stored first data set $DS_1$, a data group $DS_A$ which represents the anomaly in digital form. Furthermore, in order to generate an interference-free second data set $DS_2$, the anomaly thus detected is extracted from the stored first data set $DS_1$, with the resulting interference-free data set $DS_2$ then being used to determine the measured value $X_M$, which represents the physical variable to be measured for the flowing fluid.

In one embodiment of the method of the invention, in order to generate the interference-free data set $DS_2$, an average value U of the voltage induced in the flowing fluid is determined using a portion of the measurement signal u, or of the already digitized measured signal $U_D$, and kept available in data memory 33 for further computations. Advantageously, the average value U can be determined using the currently stored data set $DS_1$, and/or a data set which was derived from the measurement signal u during an earlier switching phase, preferably during the immediately preceding switching phase or during the preceding switching phase of the same current direction, and temporarily stored. Preferably, data, which does not belong to the data group $DS_A$ representing the anomaly and can thus be regarded as essentially interference-free, is used for the determination of the average value U.

Thus, using the average value U, interference can be very effectively eliminated from the data set $DS_1$ in a simple manner by simply erasing the individual data of the data group $DS_A$ representing the anomaly from the currently stored data set $DS_1$ and putting the respective instantaneous average value U in the "vacated" places of the data set $DS_1$. During wide variations of the flow rate, however, a considerable amount of measurement information may be lost in this manner.

Figure 6B:
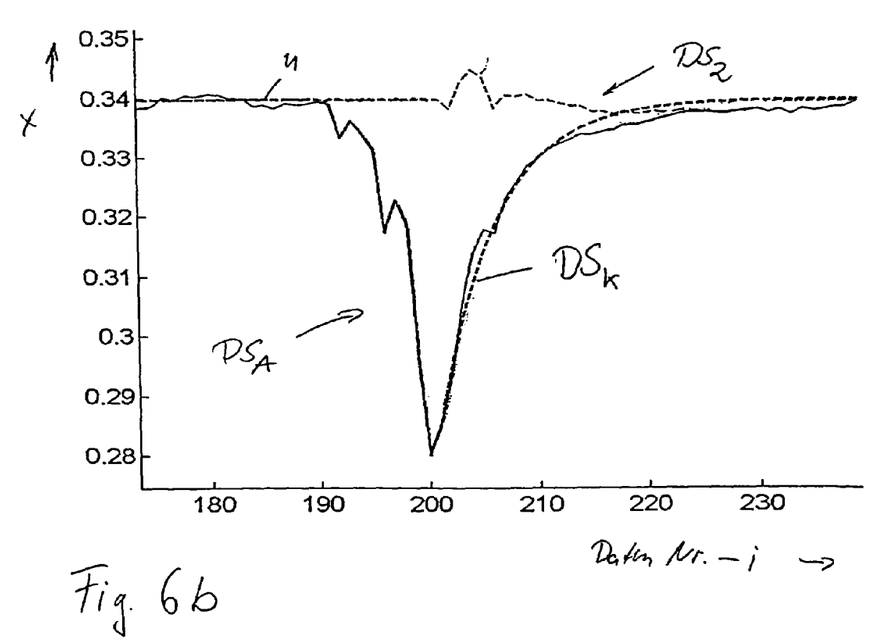

Based on the recognition that most interfering potentials have, qualitatively, essentially comparable waveforms, which are thus at least qualitatively determinable beforehand or at least readily estimable, according to a further development of the method of the invention, the interference-free second data set $DS_2$, as indicated in FIGS. 6b, is formed using a data set $DS_K$ of artificially generated digital data (third data set) which approximates the waveform of the interference voltage. This data is computed by evaluation circuit 3 using at least part of the data from the previously located data group $DS_A$ representing the anomaly and temporarily stored in data memory 33 if necessary.

The interference-free second data set $DS_2$ can now advantageously be generated by first selecting a respective data value x from the data group $DS_A$, which represents the anomaly, and from the third data set $DS_K$, with the two selected data values x having corresponding, especially identical, time values i, and by forming a numerical difference of the two selected data values x. This is repeated until all the data values x from the data group $DS_A$ have been used. In this manner, an interfering potential approximated in its waveform, particularly in its amplitude and duration, is subtracted from the measurement signal u in a virtual mode. Thus, assuming that the voltage exceeding the approximated waveform of the interfering potential is essentially the actual measurement voltage of interest, only the portion of the measurement signal corresponding to the physical variable remains in the interference-free data set $DS_2$.

To generate the artificial data set $DS_K$, according to a further development of the invention, evaluation circuit 3 determines at least one regression function for at least part of the digital data from the data group $DS_A$ representing the anomaly and uses this regression function to determine the artificial data set $DS_K$. In one embodiment of this development of the method of the invention, at least one coefficient $T_1$, but preferably two or more, are determined for the at least one regression function using data values x from the data group $DS_A$.

To determine the regression function, especially the coefficients $T_1$ for the regression function, an algorithm based on Gauss' principle of least squares, for example, can be programmed into evaluation circuit 3 and applied to the data group $DS_A$ currently available in data memory 33.

Compared with the above embodiment in which only the current average value U is used as a substitute for the data from the data group $DS_A$ representing the anomaly, the use of a suitable regression function, particularly the use of the interference-free data set $DS_2$ thus generated, made it possible to at least halve, and thus significantly further reduce, the measurement error.

Investigations of representative applications have also shown that a particularly frequently occurring waveform of interfering potentials of the kind described is very similar to that of short-duration, needle-shaped voltage pulses, for example. The interfering potentials have a generally relatively steeply rising edge followed by an essentially exponentially falling edge. Based on this recognition, in another embodiment of the aforementioned development of the invention, at least one coefficient for the at least one regression function is determined as a time constant of an exponentially decreasing, e.g., first- or higher-order, regression function.

In a further embodiment of the invention, provisional coefficients, particularly a sequence of provisional coefficients, are first generated for the regression function, e.g. by repeated sequential application of the aforementioned computation rule to different data pairs from the data group $DS_A$ representing the anomaly. According to a further development, the provisional coefficients determined are digitally filtered, for instance individually immediately after their computation or only after the computation of the entire sequence of coefficients. Investigations have shown that, particularly if a recursive digital filter is used for the sequence of coefficients, good measurement results, particularly robust results and results which are accurately reproducible even in the presence of a broad spectrum in the interfering potentials, can be achieved even with a low-order filter. In a preferred embodiment, the sequence of provisional coefficients can be determined according to the following formation rule, $$\hat{T}_n = \lambda \cdot T_n + (1-\lambda) \cdot \hat{T}_{n-1}, \tag{1}$$

where $T_n$—a provisional coefficient for the regression function, computed in the currently executed, computation step, $T_{n-1}$—a provisional coefficient for the regression function, computed in the preceding computation step, $T_n$—an intermediate value predetermined for the current computation step, and $\lambda, (1-\lambda)$—predetermined filter coefficients for the digital filter, with $0<\lambda<1$.

It is possible either to store the provisionally determined coefficients individually or to hold only the respective current and preceding coefficients in data memory 33. The computation rule is applied until a predetermined number of loops, e.g., a number equal to the number of data in the data group $DS_A$ representing the anomaly, has been executed and/or until a previously selected abort criterion, e.g., a sufficiently small change between last provisional coefficients computed, is satisfied. The last coefficient computed will then correspond to the coefficient $T_1$ sought for the regression function.

If an interfering potential appears between the measuring electrodes over a prolonged period of time, thus over several measurement phases, the coefficient will be computed using a corresponding coefficient determined in an immediately preceding measurement phase; this older coefficient can then serve as a current provisional coefficient $T_{n-1}$, for example.

In a further embodiment of the method of the invention, the coefficient or coefficients for the at least one regression function are computed using the instantaneous average value U determined for the voltage induced in the flowing fluid. This can advantageously be implemented numerically already during the determination of the intermediate values for the provisional coefficients based on the following computation rule:

$$T_n = \left. \frac{(i_1 - i_2)}{\ln\left(\frac{x_{i2} - U}{x_{i1} - U}\right)} \right|_n \quad (2)$$

where $x_{i1}$, $x_{i2}$—are a first and a second data value from the data group $DS_A$ representing the anomaly, and $i_1$, $i_2$—are their subscripts, which correspond to the respective associated time values.

In this embodiment of the method using Eq. (2), a first difference is formed between a first data value $x_{i1}$ from the data group $DS_A$ representing the anomaly and the instantaneous average value U determined for the voltage induced in the flowing fluid, and a second difference is formed between a second data value $X_{i2}$ from the data group $DS_A$ and the instantaneous average value U determined for the voltage induced in the flowing fluid. For a quotient determined from the first and the second differences, the natural logarithm is determined numerically, on which a previously formed difference between the time values or subscripts $i_1$, $i_2$ of the currently used data values $x_{i1}$, $x_{i2}$ is then normalized.

To detect the anomaly, in a further embodiment of the invention, a first time value $t_S$, which represents an instant of the start of the interference voltage, is determined by means of the first data set $DS_1$. To this end, the digital data of the first data set $DS_1$, can, for instance, be compared with a predeterminable first threshold value $TH_s$, particularly a threshold value variable in operation, and a first comparison value generated for signalling that the first threshold value $TH_s$ has been exceeded. The first time value $t_s$ can be calculated from $t_s = i_s/f_a$ where $i_s$ is the subscript of the first data value determined to exceed the threshold value. Furthermore, to detect the anomaly by means of the first data set $DS_1$, a second time value $t_e$ is determined, for example based on $t_e = i_e/f_a$, which represents an instant of the ending of the interference voltage. In analagous fashion, the digital data of the first data set $DS_1$ can be compared, for example, with a predeterminable second threshold value $TH_e$, particularly a threshold value variable in operation, to generate a corresponding second comparison value signalling a subceeding of, or a falling beneath, the second threshold value $TH_e$. At this point it should be noted that the aforementioned comparisons actually relate to the absolute value of the measurement signal u. If these comparisons are to take into account the sign of the measurement signal u, the thresholds $TH_s$, $TH_e$ for negative voltages have to be fixed at the corresponding opposite values.

Based on the assumption that for physical or technological reasons, the flow rate between two successive measured phases T112 and T122, for example, can only vary to a comparatively small extent, in a preferred embodiment of the invention, at least one of the threshold values $TH_s$, $TH_e$ is determined in operation and adapted to the fluid currently flowing in measuring tube 11, particularly to a flow rate value determined for an earlier switching phase. Advantageously, the threshold value $TH_s$ or $TH_e$ can be formed using an average value U of the measurement signal u determined in an earlier measurement phase, particularly in an immediately preceding or a youngest, undisturbed measurement phase, for example by a simply increasing the threshold value during operation by a value corresponding to the maximum increase of the measurement signal u to be expected within the meanwhile elapsed time, or by a corresponding percentage.

In a further embodiment of the method of the invention, the anomaly is detected by determining at least one amplitude value and an associated third time value by means of the first data set $DS_1$, with the amplitude value representing an amplitude, particularly a maximum absolute amplitude, of the measurement signal within a predeterminable time interval. Furthermore, it is provided for detecting the anomaly that several or all data of the first data set $DS_1$, or only the data for the amplitude value, are compared with a predeterminable third threshold value $TH_a$, particularly a threshold value variable in operation. This threshold value is chosen to be greater than the first threshold value $TH_s$ and represents a predetermined minimum amplitude for a voltage rise to be detected as an anomaly. In addition to this, a corresponding third comparison value is generated which signals that the threshold value $TH_a$ has been exceeded.

In another embodiment of the invention, the anomaly is detected by comparing the digital data of the first data set $DS_1$ with a predeterminable third threshold value $TH_a$ and generating the third comparison value in a corresponding manner, which signals that the threshold value $TH_a$ has been exceeded.

In a further embodiment of the invention, in order to detect the anomaly, a time difference $t_e - t_s$ is formed between the previously determined first time value $t_s$, representing the start of the interference voltage, and the second time value $t_e$, representing the end of the interference voltage, to determine a fourth time value, which represents the duration of the occurrence of the interference voltage. This fourth time value can then be compared with a corresponding fourth threshold value, which represents a predeterminable minimum duration for a voltage pulse regarded as an anomaly to be eliminated.

Furthermore, in the case of a data set $DS_1$ which is not totally disturbed, the average value U of the voltage induced in the flowing fluid can be calculated using digital data with a time value less than the previously determined first time value $t_s$ and/or using digital data of the data set $DS_1$ having a time value greater than the second time value $t_e$.

It is also possible to determine, in addition to the abovementioned regression function, a further regression function for at least a second part of the digital data from the data group $DS_A$ representing the anomaly, e.g., an ascending straight line for the leading edge of the interference voltage pulse, and to generate the data of the artificial data set $DS_K$ also by using this second regression function.

Following the generation of the interference-free data set $DS_2$, the value representing the physical variable to be measured can be calculated by means of evaluation circuit 3 in the usual manner, for example in the manner described in U.S. Pat. No. 4,382,387, U.S. Pat. No. 4,422,337, or U.S. Pat. No. 4,704,908 for a flow-rate measurement. The determination of, e.g., the flow rate, as mentioned, is based on the evaluation of the instantaneous flowrate-dependent amplitude characteristic of the voltage taken between the two measuring electrodes 14, 15, which can now be determined with a high degree of accuracy in the conventional manner by means of the interference-free data set $DS_2$ held in data memory 33. The current interference-free data set $DS_2$, or several such stored data sets, can also be used to determine further physical quantities of interest, such as a viscosity of the fluid, a flow index, a degree of turbulence, or the like.

At this point it should be noted that instead of using a single differential amplifier for the measuring electrodes 14, 15 to generate an analog difference signal, a corresponding separate signal amplifier may, of course, be provided for each of the electrodes 14, 15. Accordingly, the difference of the two potentials $e_{14}$, $e_{15}$ obtained from electrodes 14, 15 may also be calculated by means of two digitized measurement signals and numerically.

Both the methods of evaluation required for generating the interference-free data set $DS_2$ using the data set $DS_1$ and for determining the measured values $X_M$ by means of the interference-free data set $DS_2$ can be implemented in the manner familiar to those skilled in the art, e.g. as a computer program running in microprocessor 30. The necessary program codes can be readily implemented in a writable memory 36 of evaluation stage 3, particularly in a permanent memory, such as an EPROM, an EEPROM, or a flash EEPROM, to which microprocessor 30 has read access during operation.

In a preferred embodiment, microprocessor 30 is implemented with a digital signal processor, e.g., of the type TMS 320 C 33 of Texas Instruments, Inc. In control unit 3, a signal processor, for example, may be provided in addition to microprocessor 30, if necessary.

The flowmeter may be connected to a fieldbus (not shown), for example, and thus linked to a remote control room and to an external power supply which feeds the flowmeter via an internal supply unit 4. To send meter data, particularly the measured flow-rate value, to the fieldbus, the flowmeter further comprises a communications unit 5 with suitable data interfaces 51. Furthermore, communications unit 5 may comprise a display and control unit 52, particularly to visualize meter data and/or to permit on-site adjustment of the flowmeter.

Among the advantages of the invention is in the fact that, particularly since it dispenses with higher-order digital filters for the sampling sequence AF or the first data set or with a complex spectral analysis of the same in the frequency domain, the measured value is determined after a comparatively short time, even if the data set used is disturbed in whole or in part. This can even be achieved for disturbances of the measurement signal u which are present over two or more measurement phases. In addition, the method according to the invention, apart from requiring very little computing time, provides significantly higher selectivity with respect to disturbances of the kind described than digital filters of correspondingly higher order which are comparable with regard to their action. In particular, very good results can be achieved for interfering potentials of the above-mentioned second kind or in the case of high-viscosity liquids, such as pulp. A further advantage of the invention is that the method can be implemented using both conventional flow sensors and conventional operating circuits. Even conventional evaluation circuits can be used, if the implemented software is modified in a suitable manner. Another advantage of the method of the invention is that it can be used also for process measuring devices other than that of the example of an embodiment presented here. For example, the method is very advantageously usable for flowmeters working by means of ultrasonic sensors or by means of measuring tubes that vibrate during operation.

While the invention has been illustrated and described in detail in the drawings and foregoing description, such illustration and description is to be considered as exemplary and not restrictive in character, it being understood that only exemplary embodiments have been shown and described and that all changes and modifications that come within the spirit and scope of the invention as described herein are desired to protected.

The invention claimed is:

1. A method of operating a process measuring device including a measuring tube inserted in a line conducting a medium, the method comprising the steps of:

causing the medium to flow through the measuring tube;

causing an electrical excitation current to flow through an operating circuit of the process measuring device to drive an excitation arrangement arranged on the measuring tube, and using the excitation arrangement to act on the measuring tube and/or on the medium flowing therethrough;

using a sensor arrangement arranged on the measuring tube to produce at least one measurement signal corresponding to the physical, measured variable;

digitizing at least a portion of the measurement signal and storing, within a data memory provided in the process measuring device, said at least one segment of said digitized measurement signal to generate a digital sampling sequence representative of a waveform of the measurement signal;

detecting an anomaly in the waveform of the measurement signal caused at least in part by an interfering potential contained in the measurement signal;

providing artificially generated digital data;

extracting data belonging to said anomaly in the waveform and using said artificially generated digital data for generating an interference-free waveform of the measurement signal; and using said interference-free waveform of the measurement signal to determine a measured value representative of a physical variable of the flowing medium.

2. A Process measuring device for a medium flowing in a line, said process measuring device, comprising:

a measuring tube insertable into the line for conducting the medium;

at least two measuring electrodes for picking up potentials induced in the medium flowing through the measuring tube and cut by a magnetic field; and an evaluation and operating circuit, connected at least intermittently to the measuring electrodes for generating at least one measurement signal derived from the potentials picked up by the measuring electrodes, said evaluation and operating circuit including data memory for storing digital data, wherein:

said evaluation and operating circuit detects an anomaly in the measurement signal caused by an interfering potential appearing at at least one of the measuring electrodes; extracts data having been stored within said data memory and being representative for the detected anomaly; generates artificially digital data for approximating the waveform of the measurement signal; and uses the artificially generated digital data for generating at least one measured value representative of a physical variable of the flowing medium.

3. The method as claimed in claim 1, wherein:

the step of detecting an anomaly in the waveform of the measurement signal includes a step of comparing digital data of said digital sampling sequence representative of a waveform of the measurement signal with at least one threshold value.

4. The method as claimed in the claim 3, wherein:

said step of detecting an anomaly in the waveform of the measurement signal further includes a step of generating a comparison value signalling that said at least threshold value has been exceeded by digital data of said digital sampling sequence.

5. The method as claimed in claim 3, further comprising a step of:
adapting said at least one threshold value to the medium currently flowing in the measuring tube.

6. The method as claimed in claim 3, further comprising a step of:
adapting said at least one threshold value to a flow rate value previously determined.

7. The method as claimed in claim 1, further comprising a step of:
determining a regression function for at least part of the digital data of said digital sampling sequence.

8. The method as claimed in claim 7, further comprising a step of:
using said regression function for determining said artificially generated digital data.

9. The method as claimed in claim 1, further comprising a step of:
determining a regression function for the data belonging to said anomaly in the waveform.

10. The method as claimed in claim 9, further comprising a step of:
using said regression function for determining said artificially generated digital data.

11. The process measuring device as claimed in claim 2, wherein:
said evaluation and operating circuit compares digital data of said digital sampling sequence representative of a waveform of the measurement signal with at least one threshold value for detecting said anomaly in the measurement signal.

12. The process measuring device as claimed in claim 11, wherein:
said evaluation and operating circuit generates a comparison value for signalling that said at least threshold value has been exceeded by digital data of said digital sampling sequence.

13. The process measuring device as claimed in claim 11, wherein:
said evaluation and operating circuit adapts said at least one threshold value to the medium currently flowing in the measuring tube.

14. The process measuring device as claimed in claim 11, wherein:
said evaluation and operating circuit adapts said at least one threshold value to a flow rate value previously determined.

15. The process measuring device as claimed in claim 2, wherein:
said evaluation and operating circuit determines a regression function for said data representative for the detected anomaly.

16. The process measuring device as claimed in claim 15, wherein:
said evaluation and operating circuit uses said regression function for determine said artificially generated digital data.

17. The process measuring device as claimed in claim 2, wherein:
said evaluation and operating circuit digitizes said at least one measurement signal, and store at least a segment of said measurement signal into said data memory to generate an ensemble of stored measurement data, said ensemble representing said measurement signal.

18. The process measuring device as claimed in claim 17, wherein:
said evaluation and operating circuit uses digital data stored within said memory to generate said artificially digital data.

19. The process measuring device as claimed in claim 18, wherein:
said evaluation and operating circuit uses digital data stored within said memory for generating at least one measured value.

20. A process measuring device for measuring a physical, measured variable, comprising:
an operating circuit coupled with a physical-electrical sensor registering said physical, measured variable, said operating circuit generating at least one measurement signal corresponding to said physical, measured variable, said at least one measurement signal including interfering potentials;
an evaluation circuit generating measured values representative of said physical, measured variable on the basis of the at least one measurement signal, said evaluation circuit including an analog-to-digital converter for converting said at least one measurement signal to a corresponding digital measurement signal and said evaluation circuit including data memory for storing measurement data;
wherein said evaluation circuit:
stores segments of said digital measurement signal in said data memory and uses said segments of the digital measurement signal stored within the data memory to detect, in the measurement signal, at least one anomaly corresponding to said interfering potentials,
generates artificially digital data replacing, in said segments of the digital measurement signal stored within the data memory, data representative of the detected anomaly for approximating an interference-free waveform of the measurement signal, and
uses data, which are stored in said memory and which include said artificially generated digital data for generating at least one measured value representative of said physical, measured variable to be measured.

21. The process measuring device as claimed in claim 20, wherein:
said evaluation and operating circuit digitizes said at least one measurement signal, and store at least a segment of said measurement signal into said data memory to generate an ensemble of stored measurement data, said ensemble representing said measurement signal.

22. The process measuring device as claimed in claim 21, wherein:
said evaluation and operating circuit uses digital data stored within said memory to generate said artificially digital data.

23. The process measuring device as claimed in claim 20, wherein:
said evaluation and operating circuit compares digital data of said digital sampling sequence representative of a waveform of the measurement signal with at least one threshold value for detecting said anomaly in the measurement signal.

24. The process measuring device as claimed in claim 23, wherein:
said evaluation and operating circuit generates a comparison value for signaling that said at least threshold value has been exceeded by digital data of said digital sampling sequence.

25. The process measuring device as claimed in claim 23, wherein:

said evaluation and operating circuit adapts said at least one threshold value to the medium currently flowing in the measuring tube.

26. The process measuring device as claimed in claim 23, wherein:
said evaluation and operating circuit adapts said at least one threshold value to a flow rate value previously determined.

27. The process measuring device as claimed in claim 20, wherein:
said evaluation and operating circuit determines a regression function for said data representative for the detected anomaly.

28. The process measuring device as claimed in claim 27, wherein:
said evaluation and operating circuit uses said regression function for determine said artificially generated digital data.

29. The process measuring device as claimed in claim 20, further comprising:
a measuring tube, which vibrates during operation.

30. The process measuring device as claimed in claim 20, wherein:
said tube comprises an ultrasonic sensor.

31. The process measuring device as claimed in claim 20, further comprising:
a measuring tube inserted in a line conducting said medium.

32. The process measuring device as claimed in claim 31, further comprising:
at least two measuring electrodes for picking up potentials induced in the medium flowing through the measuring tube, wherein the evaluation and operating circuit uses said measurement potentials for generating said measurement signal.

* * * * *